United States Patent [19]

Kokusho et al.

[11] Patent Number: 5,769,308

[45] Date of Patent: Jun. 23, 1998

[54] WELDING MATERIAL FOR USE IN HARD-FACING AND METHOD OF DETERMINING COMPONENTS THEREOF

[75] Inventors: Tsuyoshi Kokusho; Keizou Tanaka; Hideaki Ikeda; Masanobu Ishikawa; Hideo Nakamura, all of Saitama-ken; Shigeru Ohno; Masami Watanabe, both of Osaka, all of Japan

[73] Assignee: Honda Giken Kogyo Kabushiki Kaisha, Tokyo, Japan

[21] Appl. No.: 772,364

[22] Filed: Dec. 23, 1996

[30] Foreign Application Priority Data

Dec. 27, 1995 [JP] Japan .................................. 7-340419

[51] Int. Cl.$^6$ ............................. B23K 35/32; B23K 9/23; C21D 1/18

[52] U.S. Cl. ....................... 228/200; 228/262.4; 228/103; 219/137 WM; 148/529

[58] Field of Search .................................. 228/103, 160, 228/200, 222, 262.4; 219/137 WM, 146.23, 76.1; 148/506, 516, 517, 529, 327

[56] References Cited

U.S. PATENT DOCUMENTS 5,361,968  11/1994  Tanaka et al. ........................... 228/100
5,622,573  4/1997  Ikeda et al. .............................. 228/160

FOREIGN PATENT DOCUMENTS 08 141 783 A  4/1996  Japan .

*Primary Examiner*—Samuel M. Heinrich
*Attorney, Agent, or Firm*—Armstrong, Westerman, Hattori, Mcleland & Naughton

[57] ABSTRACT

The composition of a hard-facing welding material to be overlaid onto a cast iron base metal followed by a super-cooling treatment for hardening must lie above a line LA in a Schaeffler's structure diagram which is represented by a Cr equivalent and a Ni equivalent. On the other hand, if the base metal is preheated, the carbon precipitation line will be at the Ni equivalent of 34 (LC1), and the Cr equivalent will thus be above 4. However, if the Cr equivalent is above 4, there will occur cracks after welding (examples in which cracks occurred are shown by square marks represented by a in FIG. 1). As a solution, the carbon precipitation line was raised up to the Ni equivalent of 38 without preheating the base metal, and the Cr equivalent of the welding material was made to be 4 or less.

1 Claim, 3 Drawing Sheets

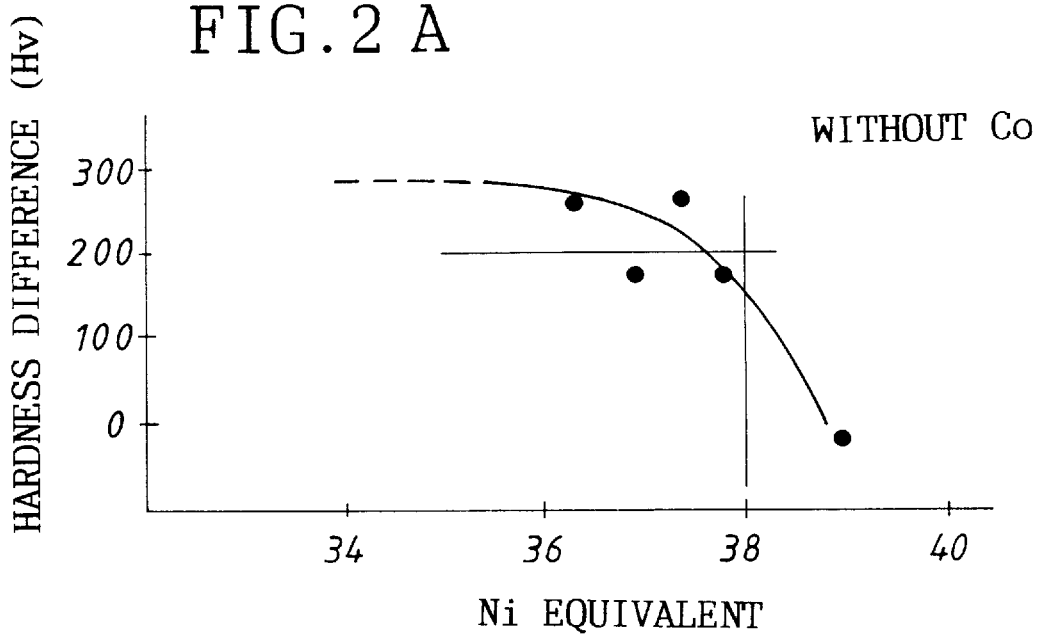
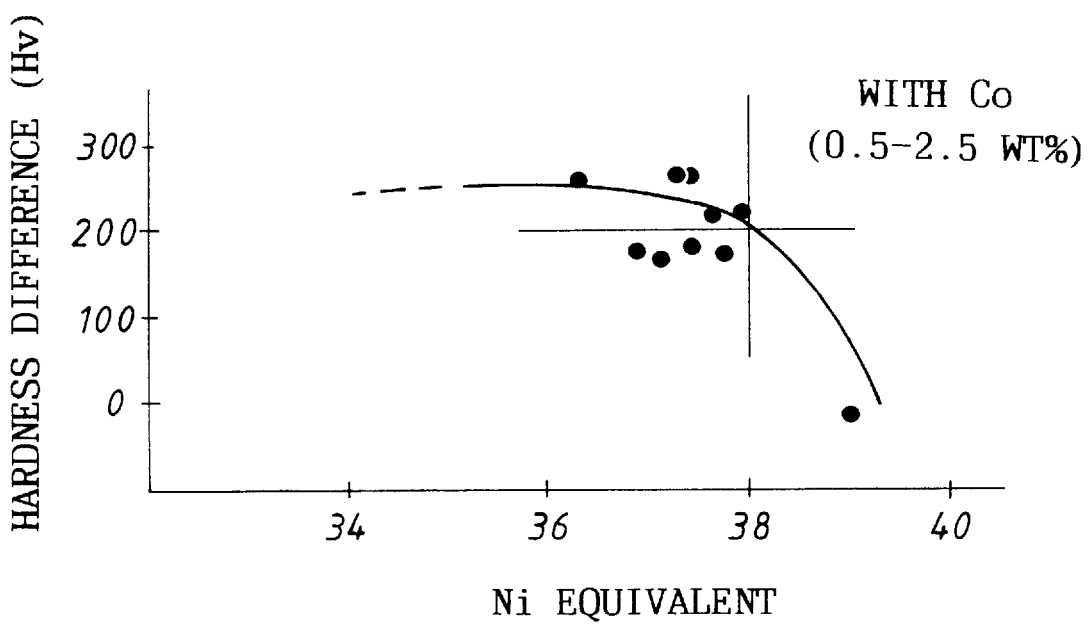

WELDING MATERIAL FOR USE IN HARD-FACING AND METHOD OF DETERMINING COMPONENTS THEREOF

BACKGROUND OF THE INVENTION

1. Field of the Invention

The present invention relates to a welding material for use in hard-facing a cast iron base metal, such as a covered electrode, a welding wire, plasma welding powder, or the like, and relates to a method of determining components of the welding material. More particularly, the present invention relates to a welding material as well as a method of determining the components thereof, the welding material being utilized in a field where the shape of a die (punch and/or matrix) is complicated and machinability and hardness after welding of the welding material are required, such as in a cold-pressing die inclusive of a metallic press die for working by pressing a metallic thin plate such as an aluminum plate, a steel plate, or the like.

2. Description of the Related Art

As a method of manufacturing a trimming die which is used in cutting blanks of a predetermined length from a rolled material of a thin metallic plate such as an aluminum plate, a steel plate or the like, or of manufacturing a trimming die which is used in cutting unnecessary peripheral portions after having formed the blanks by drawing in a drawing die, or of manufacturing similar dies, there has hitherto been known a method of overlaying or cladding by means of welding a welding material, which serves as a cutter material, onto that die raw material which has been cast into a predetermined shape, and then cutting a cutter out of this overlaid or clad portion.

This kind of welding material for overlaying should preferably have a lower hardness after having been overlaid because it must be machined into a predetermined shape to form the cutter by cutting. Once the cutter has been cut by the machining work, however, it should preferably attain a high hardness in a relatively easy way. For example, in Japanese Patent Application No. 279436/1994 (i.e., Japanese Published Unexamined Patent Application No. 141783/1996), there is disclosed a method of determining components of a welding material such that a nickel (Ni) equivalent becomes 34 or less. If the nickel equivalent is set to be above 34, a chromium (Cr) equivalent will be above 4.

In the welding material of the above-described prior art, there will be no problem if the base metal is preheated before welding. It has, however, been found that, in case the base metal is large in size and cannot be preheated, there will occur cracks after welding. It has also been found that, if the base metal is preheated, carbon will precipitate at the Ni equivalent of above 34 and consequently that no sufficient hardness was obtained even with a supercooling treatment. But it has further been found out that, if the base metal is not preheated, carbon will not precipitate at the Ni equivalent of up to about 38.

The present invention has an object of providing a welding material as well as a method of determining components of a welding material which does not cause cracks even without preheating of a base metal, which is superior in the ability to be cut after overlaying or cladding, and which is stable in hardness after a supercooling treatment.

SUMMARY OF THE INVENTION

In order to attain the above and other objects, the present invention is a welding material and a method of determining the components of the welding material for use in hard-facing a cast iron base metal. The welding material is overlaid onto the base metal without preheating the base metal followed by a supercooling treatment for hardening. The welding material has a component composition determined to meet a nickel (Ni) equivalent and a chromium (Cr) equivalent to be included in that region in a Schaeffler's structure diagram in which a hardness difference before and after the supercooling treatment in an overlaid condition is above a predetermined value, wherein the Ni equivalent is 34 through 37.5 and the Cr equivalent is 3.5 through 4 such that the component composition lies within an austenitic region.

Preferably, the welding material includes 0.5% through 1.5% by weight of cobalt (Co).

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 2A and 2B are graphs explaining an effect of presence or absence of addition of Co on hardness difference.

DETAILED DESCRIPTION OF A PREFERRED EMBODIMENT

In the present invention, a Ni equivalent, a Cr equivalent and a starting temperature of martensitic transformation (hereinafter called an Ms temperature) are defined to be obtained by the following three formulas.

Ni equivalent=30 C+Ni+0.5 Mn+0.92 Co

Cr equivalent=Cr+Mo+1.5 Si

Ms(°C.)=550-350 C—40 Mn—20 Cr—17 Ni+15 Co

Figure 1:
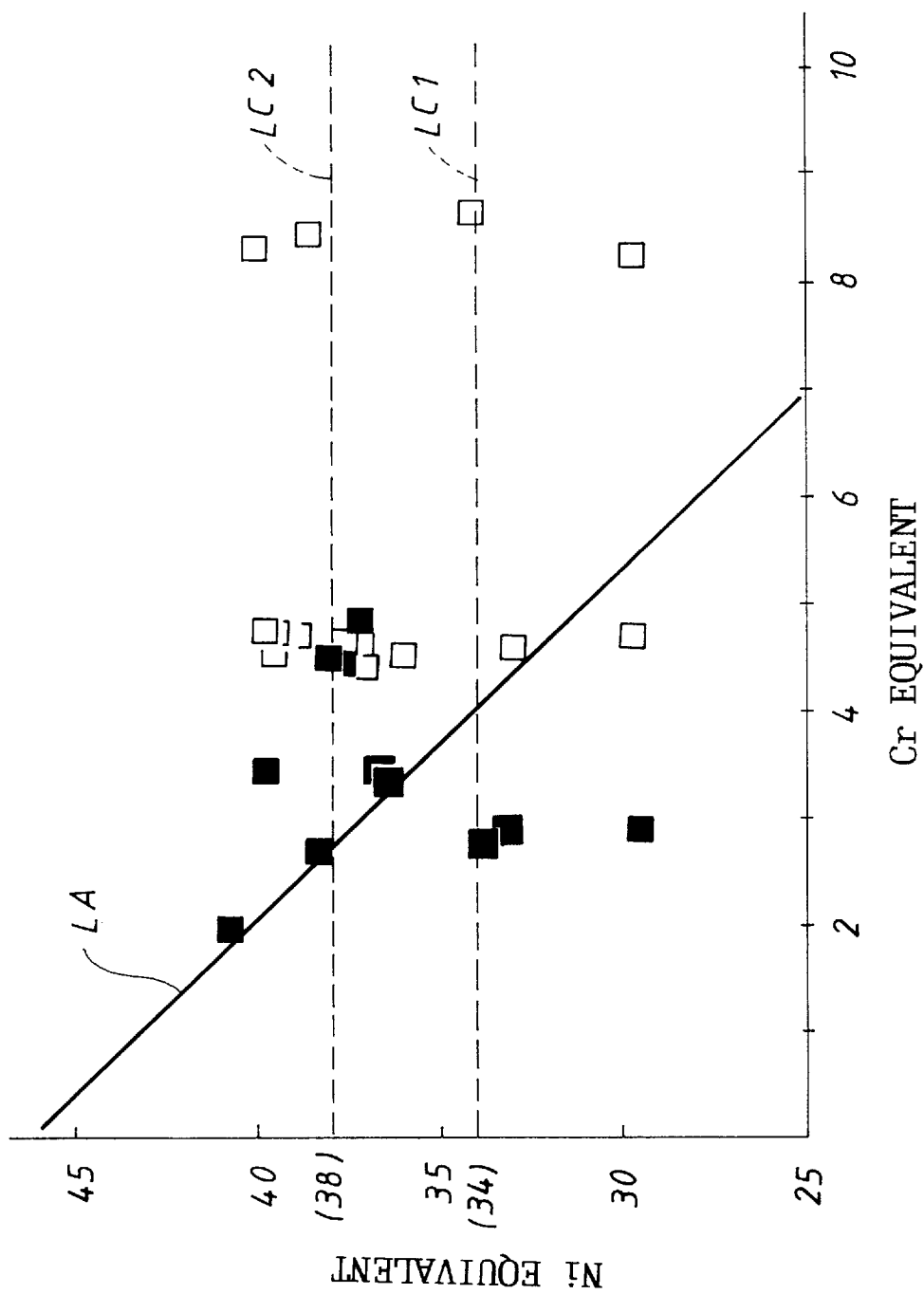
FIG. 1 is a Schaeffler's structure diagram.

In a Schaeffler's structure diagram shown in FIG. 1, line LA represents a border line between an austenitic region in which only austenite is present and a region in which both austenite and martensite are present in mixture, at room temperature. The region above line LA is the austenitic region. Even within the austenitic region, if the Ni equivalent given in the ordinate is increased, a carbide starts to be precipitated within the structure. The limit beyond which the carbide is not precipitated is influenced by a temperature at which cooling after welding is stopped. In case the base metal is preheated before welding and, consequently, the temperature at which the cooling is stopped is relatively high, the limit of carbon precipitation is at the Ni equivalent of 34 (LC1). On the other hand, in case the welding is performed without preheating the base metal, the temperature at which the cooling is stopped becomes relatively low and, as a result, the carbon precipitation line will be shifted upwards to the Ni equivalent of about 38 (LC2). Therefore, when the base metal is preheated, the composition of the welding material must fall or lie within a region covered or enclosed by the lines LA and LC1. But, when the base metal is not preheated, the composition of the welding material can be enlarged to a region covered or enclosed by the lines LA and LC2. However, if the base metal is not preheated, there were some examples in which cracks occurred after the welding. In FIG. 1 those examples in which cracks occurred are shown by hollow square marks (□) and those in which cracks did not occur are shown by solid square marks (■). As can be seen from FIG. 1, the following has been found out. Namely, whether cracks occur or not depends not on the Ni equivalent but on the Cr equivalent; cracks occur in a range of the Cr equivalent of above 4 but cracks do not occur at the Cr equivalent of 4 or less. On the other hand, in order not to fall outside the region enclosed by the lines LA and LC2, the Cr equivalent cannot be made smaller than 3. When the overlaying is made, however, the Ni equivalent rises with an increase in the amount or content of carbon as a result of melting of the base metal into the welding material at the time of welding in case the base metal is made of cast iron. Therefore, it is necessary to set the Cr equivalent at 3.5 or more in the welding material for actual or commercial use.

If the Cr equivalent is defined in this manner, the Ni equivalent must be above 34 in order to lie above the LA line. Here, the upper limit of the Ni equivalent is LC2, which corresponds to 38. However, since the Ni equivalent rises as a result of melting of carbon from the base metal as described above, the upper limit of the Ni equivalent in the welding material for commercial use is set to be 37.5.

Then, overlaying by means of welding was made by using samples of welding materials in which the Ni equivalent was sequentially increased, and measurements were made of the hardness which rose by a supercooling treatment as compared with the hardness after welding (i.e., the difference in hardness before and after the supercooling treatment was measured). With reference to FIG. 2A, it can be seen that, when the Ni equivalent is about 38, it becomes difficult to secure the required hardness difference of Hv 200. This is considered to be due to the fact that the carbon precipitation line LC2 in FIG. 1 is exceeded. It has however been confirmed that, by adding Co, the hardness difference of Hv 200 was secured even if the Ni equivalent was raised to about 38, as shown in FIG. 1B.

Figure 3:
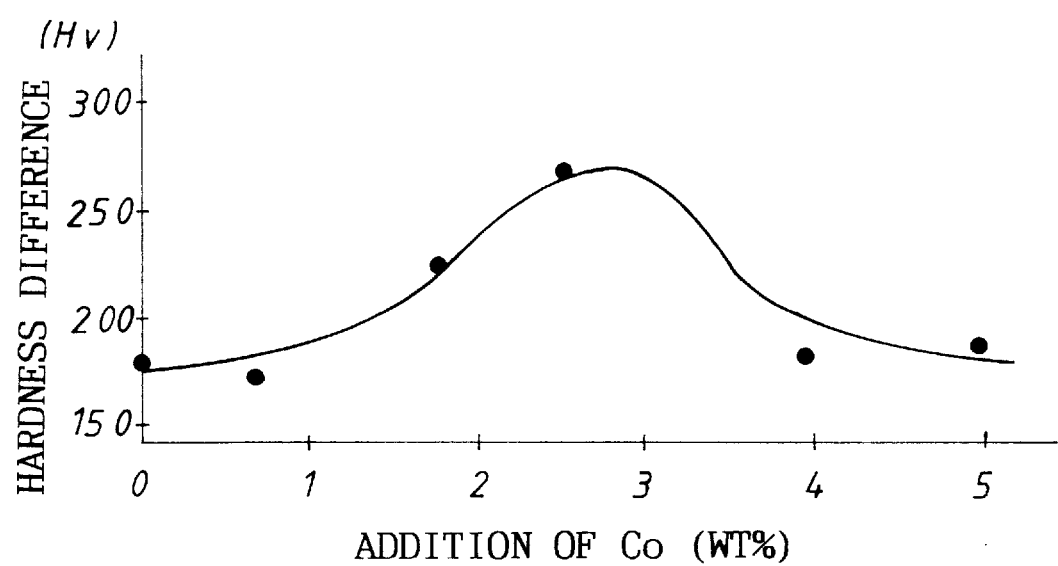
FIG. 3 is a graph for setting an upper limit of addition of Co.

Then, the next question will be how much Co should be added. As regards the change in hardness difference when the amount of addition of Co is sequentially increased, it has been found that, as shown in FIG. 3, the hardness difference rises up to a point of addition of Co in about 3% by weight but that the hardness difference cannot be obtained even with a further addition of Co. Therefore, it is meaningless to add Co in an amount of more than 3% by weight. Further, since Co increases the Ni equivalent and raises the Ms temperature, an excessive addition of Co will result in an increase in hardness after overlaying and a consequent difficulty in machining work. Therefore, in the welding material for commercial use, the addition of Co should preferably be limited to about 0.5% to 1.5% by weight.

An example of a welding material whose composition has been determined in view of the results of the above experiments is shown below.

| Component Composition (% by weight) | | | | | | |
|---|---|---|---|---|---|---|
| C | Mn | Ni | Cr | Mo | Si | Co |
| 1.1 | 1.2 | 2.0 | 2.0 | 0 | 1.2 | 1.0 |

According to this component composition, the Ni equivalent, the Cr equivalent, and the Ms temperature are respectively as follows.

Ni equivalent=37.4

Cr equivalent=3.8

Ms temperature=58

As a result of overlaying by using a welding material of the above-described composition, cracks did not occur after welding. In addition, a hardness difference of above Hv 300 was obtained by the supercooling treatment.

As can be seen from the above results, according to the present invention, it is possible to provide a method of determining the components of a welding material for overlaying which does not cause cracks after welding.

It is readily apparent that the above-described method of determining components of a welding material meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of determining components of a welding material for use in hard-facing a cast iron base metal, said welding material being overlaid onto the base metal without preheating the base metal followed by a supercooling treatment for hardening, said method comprising:

determining a component composition of said welding material to meet a nickel (Ni) equivalent and a chromium (Cr) equivalent to be included in that region in a Schaeffler's structure diagram in which a hardness difference before and after the supercooling treatment in an overlaid condition is above a predetermined value;

wherein said Ni equivalent is selected to be 34 through 37.5 and said Cr equivalent is selected to be 3.5 through 4 such that said component composition lies within an austenitic region.

* * * * *